United States Patent Office 2,880,101
Patented Mar. 31, 1959

2,880,101

MANUFACTURE OF STEAM-CURED LIGHT-WEIGHT CONCRETE

Leo Torsten Ulfstedt, Sodertalje, Sweden, assignor to Internationella Siporex AB, Stockholm, Sweden, a corporation of Sweden No Drawing. Application May 28, 1956
Serial No. 587,457

19 Claims. (Cl. 106—87)

This invention concerns the manufacture of light-weight concrete and more particularly the invention relates to an improvement in the manufacture of steam-cured porous or cellular light-weight concrete.

As is well known, manufacture of steam-cured porous or cellular light-weight concrete principally takes place as follows:

One or more finely divided inorganic or mineral binders having a large content of lime are intimately mixed with finely divided siliceous materials and water. The mixture so obtained is cast in molds, rendered porous and, if required, reinforced. After the mixture has solidified, the molds are inserted in autoclaves in which the concrete mixture is subjected to the action of steam under pressure. During this treatment the lime components chemically react with the siliceous materials. This reaction results in the formation of calcium hydrosilicates which form a filtered crystal mass imparting to the product its strength properties.

As lime-containing binders used in the process Portland cement, natural cement, slag cement, puzzolana cement, blast-furnace slag, slaked and unslaked lime, hydraulic lime or the like may be mentioned. The siliceous materials may consist of fine sand, ground sand, stone flour, blast-furnace slag, clay, puzzolanas such as fly ash, burnt shale, burnt clay, tile flour, diatomaceous earth and the like.

In addition, fillers of different kinds and setting and hardening regulators, such as sugar and gypsum, may be added.

The porosity of the light-weight concrete may either be produced by addition of light (porous) aggregates to the concrete mixture or by producing pores or allowing pores to be formed in the mass. Producing pores in the concrete mass may be effected in different manners: by casting the mass with a large surplus of water in which case sedimentation before setting or hardening of the concrete must be prevented by employing especially finely ground solid components and addition of stabilizers, for example finely divided asbestos; by introducing air or other gases into the mass in which case the pores thus formed are stabilized by addition of a foaming agent, for example an alkylarylsulfonate, and, maybe, also a foam stabilizing agent, such as glue; by mixing intimately a separately prepared and stabilized foam with the mass; by adding to the concrete mixture a finely divided metal, capable of developing gas in the mass, such as aluminum powder, thereby causing an expansion of the mass, immediately before the mixing solidifies.

The molds used in the process may be of a size and shape directly corresponding to the dimensions and shape of the finished concrete body, or also the molds may be divided into a number of compartments for simultaneous production of a number of such bodies. It is very customary, however, to employ large molds the contents of which are divided into smaller pieces or bodies, such as blocks or slabs, before or after steam-curing.

If the concrete is to be reinforced, the reinforcement may be effected by placing reinforcing rods, mats or cages or reinforcing steel or iron in the molds and fixing them in a suitable manner, whereupon the concrete mixture is poured into the mold. If the concrete mass is to be divided subsequently into a number of pieces or bodies, as indicated above, several reinforcing members or units are inserted, one for each part, arranged in such a manner that the division may be effected without hindrance of the reinforcement.

The steam-curing of the concrete takes place under a pressure which may vary between 2 and 20 kg./cm.$^2$ but usually lies between 5 and 10 kg./cm.$^2$.

In the manufacture of steam-cured light-weight concrete bodies as indicated above it sometimes occurs that crack formation takes place in the bodies in the steam-curing operation. Especially in the case of producing reinforced concrete bodies this tendency is pronounced. This is apparently due to the fact that the concrete mass is subjected to a shrinking in relation to the reinforcements and the steel mold.

It has now been found, according to the present invention, that this considerable disadvantage may be obviated by adding a small amount of a finely divided slow hydrating burnt magnesia to the light-weight concrete mixture. The amount of magnesia required to obtain a satisfactory result should be at least about 0.5% by weight, based on the solid components of the concrete mixture, but is generally higher, for example 2–5%, or even more, up to 10%. A suitable magnesia product for this purpose is obtained by burning magnesite. Instead of pure magnesia, it is also possible to employ burnt dolomite, which is added in a sufficient quantity, according to its content of magnesia—generally about 50%—to supply the same magnesia content in the concrete mixture, as indicated above.

It is important that the burning of the magnesia has taken place at a sufficiently high temperature to produce a slow hydrating product. For this purpose a temperature of at least 900° C. is necessary and the best results are obtained with temperatures above 1200° C. In case of using dolomite, the burning temperature should be still higher, for example 1300–1700° C. Thus, for example, so-called sintered dolomite which has been burnt at a temperature of about 1400° C. has been found excellent for the purpose in question.

Further, the added magnesia should be so finely divided that it can be distributed fairly homogeneoulsy in the concrete mixture. On the other hand, the magnesia should not be too fine-ground, since this may give rise to a too rapid slaking or hydration. It has been found that a degree of fineness corresponding to the fineness of ordinary Portland cement is suitable. That is to say, the specific surface of the magnesia should be within the range of 1000–5000 cm.$^2$/g. and preferably within the range 2000–3000 cm.$^2$/g.

The grinding of the burnt magnesite or dolomite may either be carried out separately or together with one or more of the other components of the light-weight concrete mixture. When using dolomite it may even be subjected to wet-grinding, for example together with sand, without any slaking of the magnesia taking place, due to its slow hydrating power at ordinary temperature.

As a further example of a material which may be used as a magnesia containing addition may be mentioned certain lignite ashes having a magnesia content of at least 10%. Such ashes meet the requirements both regarding the burning temperature and the fineness of the product, and may be added in a suitable amount to obtain the required magnesia content of the light-weight concrete mixture, as indicated above.

In other respects, apart from the addition of the burnt magnesia, the manufacture of steam-cured light-weight concrete according to the invention is carried out in the conventional manner, as described above. The lime containing binder and the siliceous materials may be selected among the materials mentioned in the examples above. For example, the proportions of the solid components of the light-weight concrete mixture according to the invention may suitably be within the following ranges:

Lime containing binders within the range of about 10 to 35% by weight.

Finely divided siliceous materials within the range of about 75 to 50% by weight.

Other materials, including burnt magnesia, for example 2 to 5%, porosity producing agents, for example a gas developing metal, such as aluminum powder, in an amount of 0.01 to 1.0% by weight, or a foam producing agent, for example a hydrolizyed protein or an alkyl sulfonate, in an amount of 0.1 to 6%, and, maybe, small amounts of setting regulators, such as gypsum or sugar, for example sugar in an amount of about 1% by weight, fillers etc., in total 15% by weight.

The composition is intimately mixed with water in a quantity sufficient to form a grout or slurry of suitable consistency which is poured into molds, whereupon steam-curing of the mixture is carried out under a pressure of about 5–10 kg./cm.², for example, during a period of 5–30 hours.

The explanation of the satisfactory effect of the addition of magnesia according to the present invention may be as follows: magnesia possessing the properties indicated above is only slaked (hydrated) very slowly at an ordinary temperature, whereas slaking under hydrothermal conditions, i.e. under steam-curing conditions, takes place comparatively rapidly. Since slaking is followed by an appreciable increase in volume, it will counteract shrinkage of the concrete mass in the steam-curing and may even produce a slight swelling during the steam-curing treatment. In this way crack formation in the concrete bodies in the steam-curing operation is practically completely eliminated.

The manner of carrying out the invention in practice is described more in detail in the following examples.

*Example 1.—Manufacture of steam-cured light-weight concrete from ground sand and cement*

Composition of concrete mixture: Parts by weight
Sand _____ 100–300, preferably 165–225
Cement _____ 100
Water _____ 100–250, preferably 148–215
Burnt magnesia ____ 2– 10, preferably 4– 8

The sand should have a specific area of 500 to 5000 cm.²g. and should contain at least 20% quartz or other reactive silicic acid. The cement may be ordinary Portland cement, slag cement or puzzolana cement. Magnesia burnt at a temperature above 1200° C. and having a specific surface of 2000–3000 cm.²/g. may be added in the form of pure magnesia, dolomite or lignite ashes, the quantities being so selected that the MgO-content will alwaye lie within the stated limits.

The components are mixed and rendered porous in a suitable manner, for example, by adding 0.1–1.0 part by weight of aluminum powder, or 0.1–3 parts by weight of a foaming agent, such as hydrolyzed protein, saponine, alkylarylsulfonate, or some other known type of foaming agent, in which latter case porosity is produced in the mass by blowing air therein or beating up the mass. Instead thereof, it is also possible to add a stable foam and mix it intimately with the mass. After the mass has been cast in the molds, it is allowed to expand in the case of using gas developing agents, until the mold is full. When employing the foaming methods the mold is filled directly with the mass which has been rendered porous.

The molds are then allowed to stand at room temperature or at a slightly raised temperature for 4–12 hours, so that the mass can solidify and can be divided into smaller pieces, if necessary. The mass is then inserted, with or without the molds, in the autoclaves. The latter are closed and the pressure is raised by the admission of steam. The raising of the temperature should take place uniformly and not too rapidly during a period of 1–6 hours. The autoclaves are then maintained under pressure for 5–20 hours, whereby the steam-curing reaction takes place. The pressure in the autoclave is subsequently lowered which should be done at a moderate speed during 1–4 hours.

*Example 2.—Manufacture of steam-cured gas concrete from burnt shale and hydraulic lime*

Composition of concrete mixture: Parts by weight
Burnt shale _____ 150–400, preferably 200–350
Unslaked hydraulic lime _____ 100
Water _____ 150–300
Aluminum powder _____ 0.1–0.5
Burnt magnesia _____ 3.5–10, preferably 8– 9

The mass is cast in molds in which it is allowed to expand, after which it is treated in the same manner as described in the previous example.

*Example 3.—Manufacture of steam-cured light aggregate concrete*

Composition of concrete mixture: Parts by weight
Cement _____ 50–100
Lime, slaked _____ 0–50
Fine sand _____ 100–200
Fly ash or burnt shale _____ 0–100
Dolomite, burnt _____ 10–30
Water _____ 100–200
Light aggregate, for example, expanded clay or shale _____ 400–1000

The components are mixed and the mixture is filled into the molds under vibration. The molds can then be inserted directly in the autoclaves.

*Example 4.—Manufacture of light-weight concrete from wet-ground sand and a lime-containing mineral binder*

100–300 parts of quartz sand are ground together with 100–250 parts of water and 4–20 parts of burnt dolomite. The grinding is preferably carried out in a ball or rod mill. The mixture is ground down to a specific surface of 1000–5000 cm.²/g. The sludge so obtained is mixed with 100 parts of Portland cement, or unslaked lime, and rendered porous and further treated in the same manner as indicated in Example 1.

It should be mentioned that the phrase "the concrete mixture is rendered porous" or similar expression used herein is intended to cover all methods of producing a porous light-weight concrete indicated in the specification. Likewise, the expression "porosity producing agent, used herein or in the appended claims is intended to cover all kinds of gas developing metals, foam producing agents or foams, adapted for producing a porous light-weight concrete.

What I claim is:
1. In the manufacture of steam-cured light-weight concrete bodies, the process which comprises forming a concrete mixture comprising a finely divided mineral binder with a high content of lime, a finely divided siliceous material adapted to chemically react with the lime to form calcium hydrosilicates, porosity producing agent and water, and incorporating with said concrete mixture a finely divided slow hydrating magnesia burnt at a temperature of at least 900° C. and having a fineness corresponding to a specific surface within the range 1000–5000 cm.²/g. in an amount of about 0.5% to 10% by weight, based on the solid components of the concrete mixture, to prevent formation of cracks in the concrete bodies in the steam-curing operation.

2. The process as claimed in claim 1, wherein the magnesia has been burnt at a temperature above 1200° C.

3. In the manufacture of steam-cured porous light-weight concrete bodies, the process which comprises forming a concrete mixture comprising a finely divided mineral binder with a high content of lime, a finely divided siliceous material adapted to chemically react with the lime to form calcium hydrosilicates, a metal capable of developing gas in the concrete mixture and water, and incorporating with said concrete mixture a finely divided slow hydrating magnesia burnt at a temperature above 1200° C. and having a fineness corresponding to a specific surface within the range 1000–5000 cm.$^2$/g. in an amount of from 0.5% to 10%, based on the weight of the solid components of the concrete mixture, to prevent formation of cracks in the concrete bodies in the steam-curing operation.

4. The process as claimed in claim 1 wherein the porosity producing agent is a finely divided metal capable of developing gas in the concrete mixture.

5. The process as claimed in claim 4 wherein the metal is finely divided aluminum.

6. The process as claimed in claim 1 wherein the porosity producing agent is a foam-producing substance.

7. The process as claimed in claim 3 wherein the specific surface of the burnt magnesia is within the range 2000–3000 cm.$^2$/g.

8. The process as claimed in claim 3 wherein the burnt magnesia is added in the form of burnt dolomite burnt at a temperature above 1300° C.

9. The process as claimed in claim 3 wherein sugar is added as a setting regulator.

10. In the manufacture of steam-cured porous lightweight concrete bodies, the process which comprises forming a concrete mixture comprising a finely divided mineral binder with a high content of lime, a finely divided siliceous material adapted to chemically react with the lime to form calcium hydrosilicates, a small amount of aluminum powder and water, and incorporating with said concrete mixture a finely divided slow hydrating magnesia burnt at a temperature above 1200° C. and having a fineness corresponding to a specific surface within the range 2000–3000 cm.$^2$/g. in an amount of about 2–5% by weight, based on the solid components of the concrete mixture, to prevent formation of cracks in the concrete bodies in the steam-curing operation.

11. A process for manufacturing steam-cured reinforced light-weight concrete bodies, which comprises forming a concrete mixture comprising a finely divided mineral binder with a high content of lime, a finely divided siliceous material adapted to chemically react with the lime to form calcium hydrosilicates, a metal capable of developing gas in the concrete mixture and water in a quantity sufficient to form a slurry, and incorporating with said concrete mixture a finely divided slow hydrating magnesia burnt at a temperature above 1200° C. and having a fineness corresponding to a specific surface within the range 1000–5000 cm.$^2$/g. in an amount of 0.5% to 10% by weight, based on the solid components of the concrete mixture; arranging a mold with reinforcements inserted therein; pouring said concrete slurry into the mold; and subjecting the concrete mixture to a steam-curing treatment.

12. A process for producing steam-cured porous lightweight concrete, which comprises forming a mixture comprising, based on the weight of the mixture, from 10 to 35% of a lime-containing mineral binder, from 50 to 75% of a finely divided siliceous material, from 0.5 to 10% of a slow hydrating magnesia burnt at a temperature above 1200° C. and having a specific surface within the range 1000–5000 cm.$^2$/g., a small amount of a metal capable of developing gas in the concrete mixture and a setting regulator, adding water in a quantity sufficient to form a slurry, and subjecting the concrete mixture so obtained to a steam-curing treatment under a pressure of about 4–10 kg./cm.$^2$ 13. The process as set forth in claim 12, wherein the setting regulator is selected from the groups consisting of sugar and gypsum.

14. A process for producing steam-cured porous lightweight concrete, which comprises forming a mixture comprising, based on the weight of the mixture, from 10 to 35% of a lime-containing mineral binder, from 50 to 75% of a finely divided siliceous material, from 0.5 to 10% of a slow hydrating magnesia burnt at a temperature above 1200° C. and having a specific surface within the range 1000–5000 cm.$^2$/g., a porosity producing agent in the form of a hydrolized protein in an amount of 0.1 to 6% by weight based on the solid components of the concrete mixture, and a setting regulator, adding water in a quantity sufficient to form a slurry, and subjecting the concrete mixture so obtained to a steam-curing treatment under a pressure of about 4–10 kg./cm.$^2$ 15. A process for producing steam-cured porous lightweight concrete, which comprises forming a mixture comprising, based on the weight of the mixture, from 10 to 35% of a lime-containing mineral binder, from 50 to 75% of a finely divided siliceous material, from 0.5 to 10% of a slow hydrating magnesia burnt at a temperature above 1200° C. and having a specific surface within the range 1000–5000 cm.$^2$/g., a porosity producing agent in the form of alkylarylsulfonate in an amount of 0.1 to 6% by weight, based on the solid components of the concrete mixture, and a setting regulator, adding water in a quantity sufficient to form a slurry, and subjecting the concrete mixture so obtained to a steam-curing treatment under a pressure of about 4–10 kg./cm.$^2$ 16. A process for producing steam-cured lightweight concrete, which comprises forming a mixture of the following:

| | Parts by weight |
|---|---|
| Sand | 100–300, preferably 165–225 |
| Portland cement | 100 |
| Water | 100–250, preferably 148–215 |
| Burnt magnesia | 2–10, preferably 4–8 |
| Aluminum powder | 0.1–1.0 | adding water in a quantity sufficient to form a slurry, and subjecting the concrete mixture so obtained to a steam-curing treatment under pressure.

17. A process for producing steam-cured porous lightweight concrete which comprises forming a mixture of the following:

| | Parts by weight |
|---|---|
| Burnt shale | 150–400, preferably 200–350 |
| Unslaked hydraulic lime | 100 |
| Water | 150–300 |
| Aluminum powder | 0.1–0.5 |
| Burnt magnesia | 3.5–10, preferably 8–9 | casting the mass in molds, and subjecting the concrete mixture so obtained to a steam-curing treatment under pressure.

18. A process for producing steam-cured porous lightweight concrete which comprises forming a mixture of the following:

| | Parts by weight |
|---|---|
| Portland cement | 50–100 |
| Lime, slaked | 0–50 |
| Fine sand | 100–200 |
| Fly ash or burnt shale | 0–100 |
| Dolomite, burnt | 10–30 |
| Water | 100–200 |
| Light aggregate, for example, expanded clay or shale | 400–1000 | filling said mixture into molds under vibration and subjecting said molds to a steam-curing treatment under pressure.

19. A process for producing steam-cured porous lightweight concrete which comprises forming a mixture of the following:

| | Parts by weight |
|---|---|
| Quartz sand | 100–300 |
| Water | 100–250 |
| Burnt dolomite | 4–20 | and grinding the mixture to a specific surface of 1000–5000 cm.²/g., mixing the sludge so obtained with 100 parts of Portland cement, and subjecting the concrete mixture to a steam-curing treatment under pressure.

References Cited in the file of this patent

UNITED STATES PATENTS

| | | |
|---|---|---|
| 1,863,990 | Nelson | June 21, 1932 |
| 2,215,812 | Kaplan | Sept. 24, 1940 |
| 2,598,981 | Denning | June 3, 1952 |

FOREIGN PATENTS

| | | |
|---|---|---|
| 26,478 | Great Britain | Dec. 3, 1903 |
| 417,469 | Great Britain | Oct. 5, 1934 |
| 502,780 | Great Britain | Mar. 24, 1939 |
| 648,407 | Great Britain | Jan. 3, 1951 |
| 688,483 | Great Britain | Mar. 11, 1953 |